US012609637B2

(12) United States Patent
Dai

(10) Patent No.: US 12,609,637 B2
(45) Date of Patent: Apr. 21, 2026

(54) TRANSDUCER WIRING BOARD AND METHOD FOR MANUFACTURING THE SAME

(71) Applicants: HongQiSheng Precision Electronics (QinHuangdao) Co., Ltd., Hebei Province (CN); Avary Holding (Shenzhen) Co., Ltd., Shenzhen (CN); Garuda Technology Co., Ltd., New Taipei City (TW)

(72) Inventor: Jun Dai, Hebei Province (CN)

(73) Assignees: HongQiSheng Precision Electronics (QinHuangdao) Co., Ltd., Hebei Province (CN); Avary Holding (Shenzhen) Co., Ltd., Shenzhen (CN); Garuda Technology Co., Ltd., New Taipei City (TW)

( * ) Notice: Subject to any disclaimer, the term of this patent is extended or adjusted under 35 U.S.C. 154(b) by 231 days.

(21) Appl. No.: 18/456,971

(22) Filed: Aug. 28, 2023

(65) Prior Publication Data

US 2025/0055388 A1     Feb. 13, 2025

(30) Foreign Application Priority Data

Aug. 10, 2023     (CN) .......................... 202311004086.0

(51) Int. Cl.
*G03B 5/02*          (2021.01)
*H02N 1/00*          (2006.01)
(52) U.S. Cl.
CPC ............... *H02N 1/008* (2013.01); *G03B 5/02* (2013.01); *G03B 2205/0061* (2013.01)

(58) Field of Classification Search
CPC ............ B81B 2201/033; B81B 3/0062; G02B 26/0841; G03B 2205/0069; G03B 5/02; H02K 1/008
(Continued)

(56) References Cited

U.S. PATENT DOCUMENTS

| 6,445,107 B1 * | 9/2002 | Jeong | ..................... | B82Y 10/00 |
| | | | | 310/309 |
| 6,509,670 B2 * | 1/2003 | Jeong | ..................... | H02N 1/008 |
| | | | | 359/224.1 |

(Continued)

FOREIGN PATENT DOCUMENTS

| CN | 110127591 A | 8/2019 |
| CN | 112969296 A | 6/2021 |

(Continued)

*Primary Examiner* — Burton S Mullins
(74) *Attorney, Agent, or Firm* — Muncy, Geissler, Olds & Lowe, P.C.

(57)          ABSTRACT

A transducer wiring board includes a movable unit, a fixing unit, plural suspensions, plural X-axis actuators, and plural Y-axis actuators. The movable unit includes a first movable section and plural second movable sections. The second movable sections are disposed on two sides of the first movable section along a Y axial direction. The fixing unit is spaced apart from the movable unit and includes plural fixing sections. The fixing sections are disposed on another two sides of the first movable section along an X axial direction. Each suspension connects the movable unit and the fixing unit. Each X-axis actuator connects one of the fixing sections and the first movable section. Each Y-axis actuator connects the first movable section and one of the second movable section.

14 Claims, 10 Drawing Sheets

(58) Field of Classification Search
USPC ........................................................ 310/309
See application file for complete search history.

(56) References Cited

U.S. PATENT DOCUMENTS

| | | | | |
|---|---|---|---|---|
| 6,591,678 | B2 * | 7/2003 | Sakai | G01P 15/18 |
| | | | | 73/514.32 |
| 7,142,077 | B2 * | 11/2006 | Baeck | H02N 1/008 |
| | | | | 335/78 |
| 7,149,022 | B2 * | 12/2006 | Mun | G02B 26/0841 |
| | | | | 359/224.1 |
| 7,849,742 | B2 * | 12/2010 | Wang | G01P 15/125 |
| | | | | 73/514.32 |
| 8,432,592 | B2 * | 4/2013 | Mizuno | G02B 26/0841 |
| | | | | 359/224.1 |
| 10,167,189 | B2 * | 1/2019 | Zhang | B81B 7/0048 |
| 11,692,825 | B2 * | 7/2023 | Vohra | G01C 19/574 |
| | | | | 73/504.12 |
| 2002/0136485 | A1 * | 9/2002 | Reed | G02B 6/357 |
| | | | | 359/872 |
| 2005/0099665 | A1 * | 5/2005 | Lee | G02B 26/0841 |
| | | | | 359/198.1 |
| 2006/0268383 | A1 * | 11/2006 | Cho | H02N 1/008 |
| | | | | 359/290 |
| 2019/0141248 | A1 | 5/2019 | Hubert et al. | |
| 2022/0014653 | A1 | 1/2022 | Jang | |

FOREIGN PATENT DOCUMENTS

| | | |
|---|---|---|
| TW | 202138894 A | 10/2021 |
| TW | 202318942 A | 5/2023 |

* cited by examiner

TRANSDUCER WIRING BOARD AND METHOD FOR MANUFACTURING THE SAME

CROSS-REFERENCE TO RELATED APPLICATION

This application claims priority to China Application Serial Number 202311004086.0, filed Aug. 10, 2023, which is herein incorporated by reference.

BACKGROUND

Technical Field

The present disclosure relates to a wiring board. More particularly, the present disclosure relates to a transducer wiring board and a method for manufacturing the same.

Description of Related Art

In order to improve the stability of the camera lenses, a transducer anti-shake device is currently provided. The transducer anti-shake device uses a voice coil motor as the power to move the transducer. Since the voice coil motor includes the coil and the permanent magnet, which create a problem that the package size increases, and another problem that the permanent magnet interferes with the signals.

SUMMARY

Accordingly, one objective of the present disclosure is to provide a transducer wiring board and a method for manufacturing the same to solve the problems of increased package size and signal interferences by the permanent magnet.

A transducer wiring board is provided. The transducer wiring board includes a movable unit, a fixing unit, a plurality of suspensions, a plurality of X-axis actuators, and a plurality of Y-axis actuators. The movable unit includes a first movable section and a plurality of second movable sections. The second movable sections are disposed on two sides of the first movable section along a Y axial direction. The fixing unit is disposed spaced apart from the movable unit and includes a plurality of fixing sections. The fixing sections are disposed on another two sides of the first movable section along an X axial direction. Each of the suspensions is connected to the movable unit and the fixing unit. Each of the X-axis actuators located between one of the fixing sections and one of the suspensions is connected to the one of the fixing sections and the first movable section. Each of the Y-axis actuators located between one of the second movable sections and one of the suspensions is connected to the first movable section and the one of the second movable sections.

In the foregoing, the movable unit further includes a plurality of transducer connection pads. The transducer connection pads are disposed on the first movable section.

In the foregoing, the fixing unit further includes a connecting portion. The connecting portion is connected to one of the fixing sections.

In the foregoing, each of the suspensions is a suspension wire.

In the foregoing, each of the suspensions is an elastic sheet.

In the foregoing, each of the X-axis actuator includes a pair of first comb electrodes opposite to each other. Each of the first comb electrodes includes a plurality of first fingers. The first fingers are spaced apart from and arranged in parallel with one another.

In the foregoing, a minimum distance between adjacent two of the first fingers is less than 30 microns. An aspect ratio of each of the first fingers is greater than 5.

In the foregoing, each of the Y-axis actuators includes a pair of second comb electrodes opposite to each other. Each of the second comb electrodes includes a plurality of second fingers. The second fingers are spaced apart from and arranged in parallel with one another.

In the foregoing, a minimum distance between adjacent two of the second fingers is less than 30 microns. An aspect ratio of each of the second fingers is greater than 5.

The present disclosure provides a method for manufacturing a transducer wiring board. The method for manufacturing the transducer wiring board includes providing a substrate; forming a plurality of conductive vias in the substrate; patterning the substrate; respectively adhering metal layers to a top surface and a bottom surface of the substrate by using an insulating medium after the substrate is patterned; patterning the metal layers; removing part of the metal layer on the top surface of the substrate; forming a protective film on the metal layers after the part of the metal layer on the top surface of the substrate is removed; and cutting the insulating medium and a base layer of the substrate.

Based on the above, the X-axis actuators and the Y-axis actuators of the transducer wiring board of the present disclosure can generate the pushing forces or pulling forces after the voltage is applied. In addition, the suspensions connect the movable unit and the fixing unit. Through the cooperation of the suspensions, the X-axis actuators, and the Y-axis actuators, the transducer can be bonded onto the movable unit stably to achieve the anti-shake effect. Therefore, the transducer can only move along the XY plane and its height does not change, so as to ensure the image quality. The suspensions can not only provide the support and resilient functions, but also provide the functions of transmitting signals and electrical energy without the current problem that the permanent magnet interferes with the signals. In addition to that, the configuration of the suspensions, the X-axis actuators, and the Y-axis actuators can solve the current problem of increased package size caused by the voice coil motor.

It is to be understood that both the foregoing general description and the following detailed description are by examples, and are intended to provide further explanation of the disclosure as claimed.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure. In the drawings.

DESCRIPTION OF THE EMBODIMENTS

The embodiments of the present disclosure are discussed in detail below. However, it will be appreciated that the embodiments provide many applicable concepts that can be implemented in various specific contents. The embodiments discussed and disclosed are for illustrative purposes only and are not intended to limit the scope of the present disclosure. For example, "the formation of a first feature over or on a second feature" in the description that follows may include embodiments in which the first and second features are formed in direct contact, and may also include embodiments in which additional features may be formed between the first and second features, such that the first and second features may not be in direct contact.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The device may be otherwise oriented (rotated 90 degrees or at other orientations) and the spatially relative descriptors used herein may likewise be interpreted accordingly.

Figure 1:
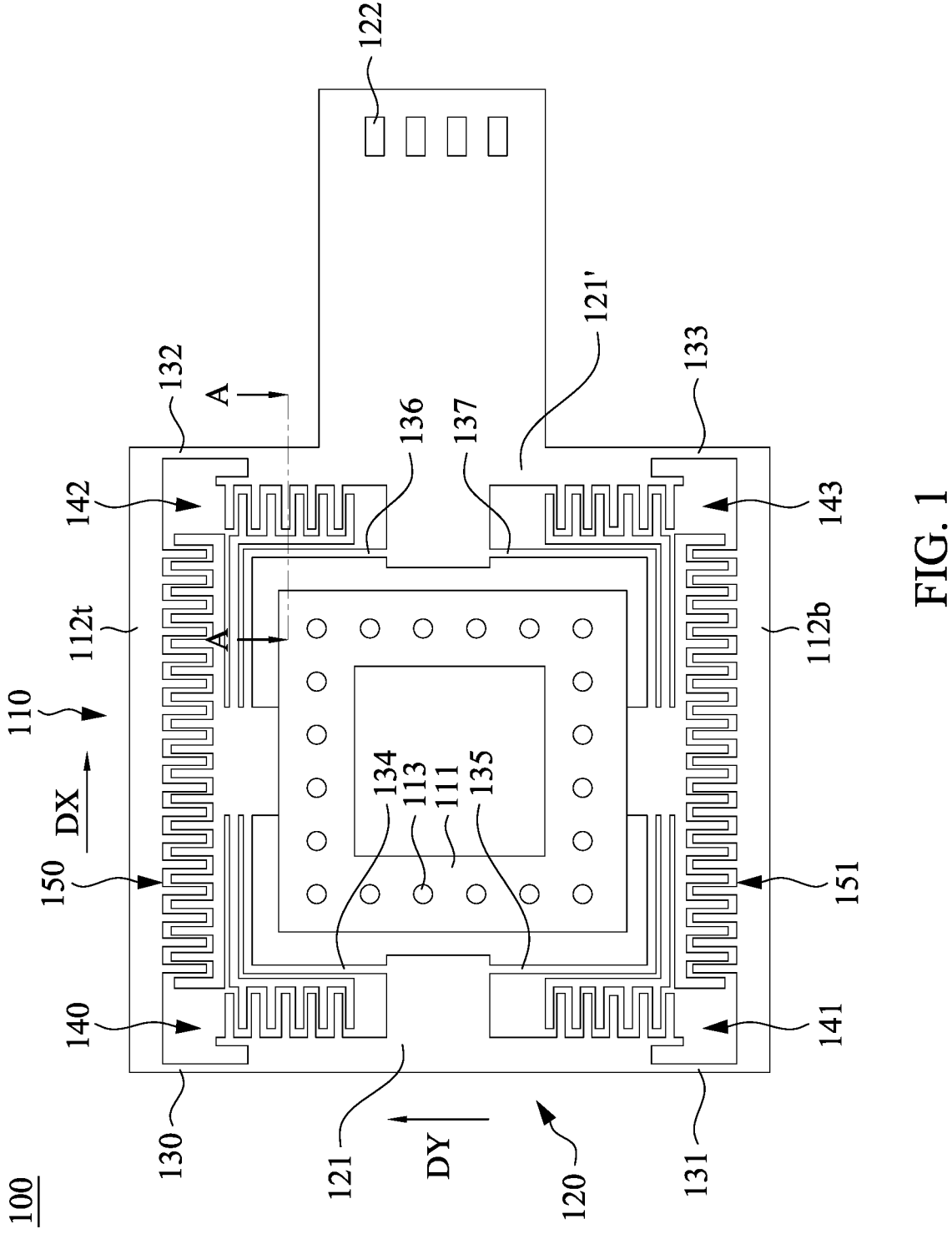
FIG. 1 depicts a schematic top view of wire connections of a transducer wiring board according to at least one embodiment of the present disclosure.
Figure 2:
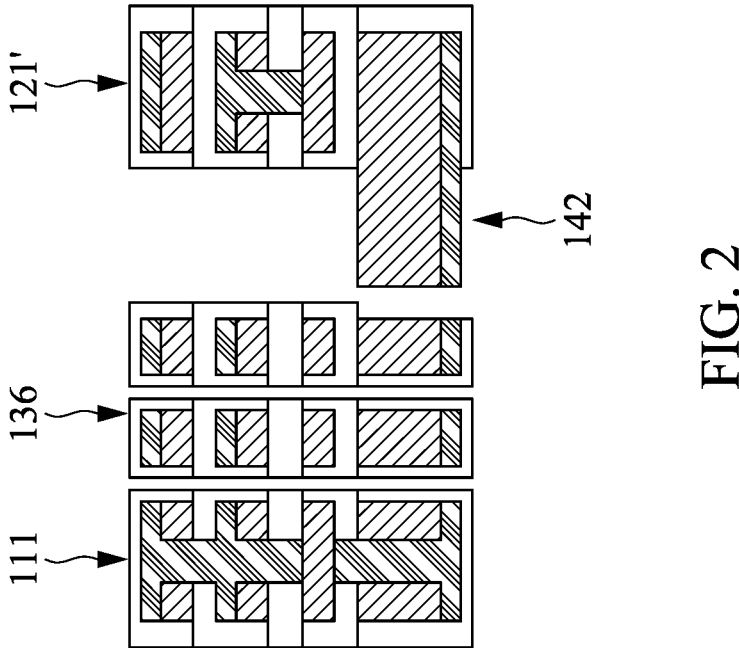
FIG. 2 depicts a schematic cross-sectional view of the transducer wiring board taken along line A-A in FIG. 1.

A description is provided with reference to FIG. 1 and FIG. 2. FIG. 1 depicts a schematic top view of wire connections of a transducer wiring board 100 according to at least one embodiment of the present disclosure. FIG. 2 depicts a schematic cross-sectional view of the transducer wiring board 100 taken along line A-A in FIG. 1. The transducer wiring board 100 includes a movable unit 110, a fixing unit 120, a plurality of suspensions 130, 131, 132, 133, 134, 135, 136, and 137, a plurality of X-axis actuators 140, 141, 142, and 143, and a plurality of Y-axis actuators 150 and 151.

Figure 3:
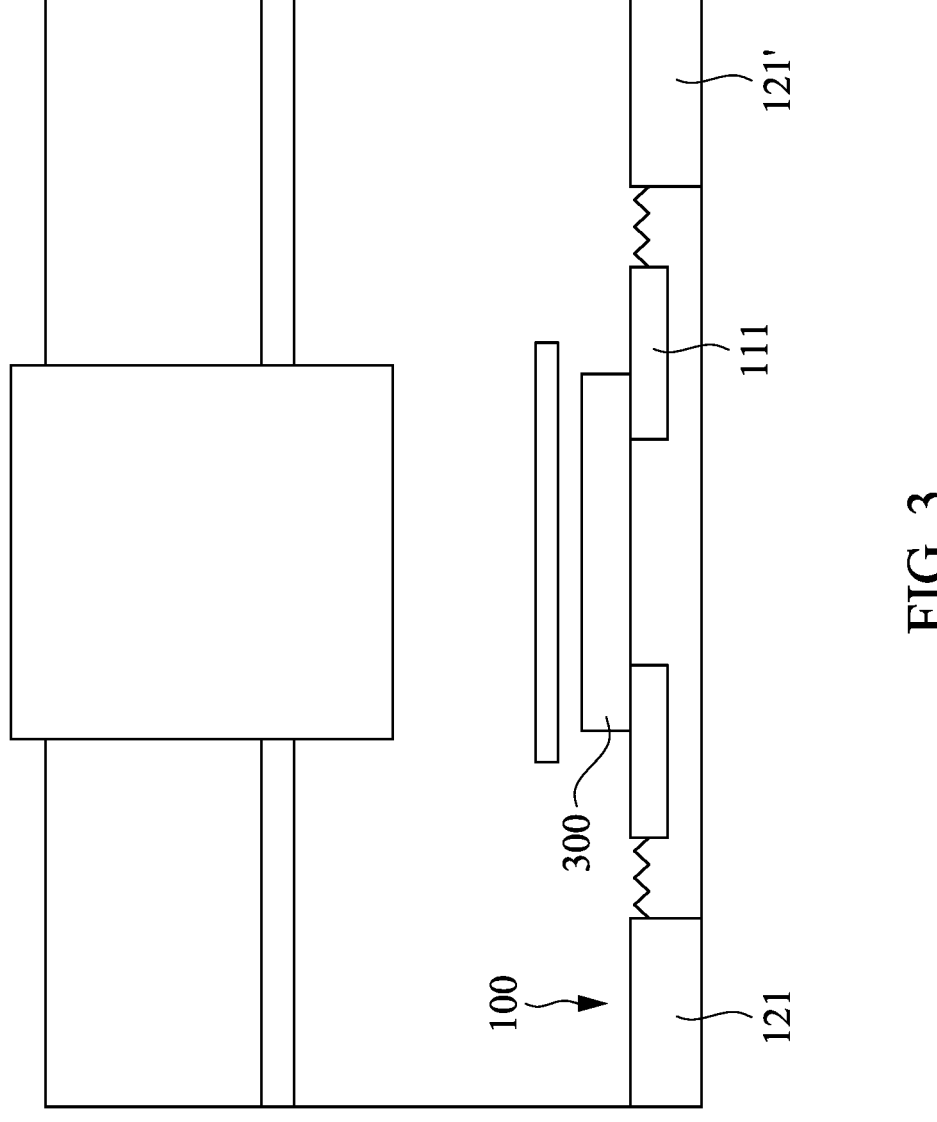
FIG. 3 depicts a schematic diagram of a use state of a transducer wiring board according to at least one embodiment of the present disclosure.

With additional reference to FIG. 1. The movable unit 110 includes a first movable section 111 and a plurality of second movable sections 112t and 112b. These second movable sections 112t and 112b are disposed on two sides of the first movable section 111 along a Y axial direction DY. In greater detail, the second movable section 112t is located above the first movable section 111, and the second movable section 112b is located below the first movable section 111, as shown in FIG. 1. In one example, the movable unit 110 further includes a plurality of transducer connection pads 113. The transducer connection pads 113 are disposed on the first movable section 111. Then, a description is provided with reference to FIG. 1 and FIG. 3. FIG. 3 depicts a schematic diagram of a use state of the transducer wiring board 100 according to at least one embodiment of the present disclosure. In a camera lens 200, a transducer 300 can be bonded onto the transducer connection pads 113 of the first movable section 111.

As shown in FIG. 1, the fixing unit 120 is disposed spaced apart from the movable unit 110 and includes a plurality of fixing sections 121 and 121'. These fixing sections 121 and 121' are disposed on another two sides of the first movable section 111 along an X axial direction DX. In greater detail, the fixing section 121 is located on a left side of the first movable section 111, and the fixing section 121' is located on a right side of the first movable section 111, as shown in FIG. 1. In one example, the fixing unit 120 further includes a connecting portion 122. The connecting portion 122 is connected to one of the fixing sections 121'. In greater detail, the connecting portion 122 is located on the right side of the first movable section 111 and connected to the fixing section 121', as shown in FIG. 1.

A description is provided with reference to FIG. 1. The suspensions 130, 131, 132, 133, 134, 135, 136, and 137 connect the movable unit 110 and the fixing unit 120. The suspensions 130, 131, 132 and 133 are spaced apart from one another and located in a periphery of the first movable section 111. The suspensions 134, 135, 136, and 137 are spaced apart from one another and located between the first movable section 111 and the suspensions 130, 131, 132 and 133 in the periphery.

In greater detail, the suspension 130 connects the second movable section 112t and the fixing section 121. The suspension 131 connects the second movable section 112b and the fixing section 121. The suspension 132 connects the second movable section 112t and the fixing section 121'. The suspension 133 connects the second movable section 112b and the fixing section 121'. The suspension 134 connects one end of the first movable section 111 adjacent to the second movable section 112t and the fixing section 121. The suspension 135 connects one end of the first movable section 111 adjacent to the second movable section 112b and the fixing section 121. The suspension 136 connects one end of the first movable section 111 adjacent to the second movable section 112t and the fixing section 121'. The suspension 137 connects one end of the first movable section 111 adjacent to the second movable section 112b and the fixing section 121'. The suspensions 134, 135, 136, and 137 are located at the corners and have higher rigidity and resistance to bending fatigue. The suspensions 134, 135, 136, and 137 can also provide transmission of signals, electrical energy, etc. in addition to providing support and resilient functions. That is, signals of the transducer 300 can be transmitted to the fixing section 121' through the suspensions 134, 135, 136, and 137 so as to be transmitted to the connecting portion 122.

In one example, the suspensions 130, 131, 132, 133, 134, 135, 136, and 137 may be supporting and resilient members, such as suspension wires or elastic sheets, etc. In one example, a material of the suspensions 130, 131, 132, 133, 134, 135, 136, and 137 may be an alloy, such as titanium copper. It is further etched into different dimensions, such as a smaller width and a larger thickness, that is, a high aspect ratio, to achieve movement and resilience in a plane direction and high bending resistance in a height direction.

A description is provided with reference to FIG. 1. The X-axis actuators 140, 141, 142, and 143 are located between their adjacent fixing sections 121 and 121' and their adjacent suspensions 134, 135, 136, and 137. The X-axis actuators 140, 141, 142, and 143 connect their adjacent fixing sections 121 and 121' and the first movable section 111. In greater detail, the X-axis actuator 140 is located between the fixing section 121 and the suspension 134 and connects the fixing section 121 and the one end of the first movable section 111 adjacent to the second movable section 112t.

The X-axis actuator 141 is located between the fixing section 121 and the suspension 135 and connects the fixing section 121 and the one end of the first movable section 111 adjacent to the second movable section 112*b*. The X-axis actuator 142 located between the fixing section 121' and the suspension 136 connects the fixing section 121' and the one end of the first movable section 111 adjacent to the second movable section 112*t*. The X-axis actuator 143 located between the fixing section 121' and the suspension 137 connects the fixing section 121' and the one end of the first movable section 111 adjacent to the second movable section 112*b*.

A description is provided with reference to FIG. 1. The Y-axis actuators 150 and 151 are located between their adjacent second movable section 112*t* and 112*b* and their adjacent suspensions 134, 135, 136, and 137. The Y-axis actuators 150 and 151 connect the first movable section 111 and their adjacent second movable sections 112*t* and 112*b*. In greater detail, the Y-axis actuator 150 is located between the second movable section 112*t* and the suspension 134 (and the suspension 136), and the Y-axis actuator 150 connects the first movable section 111 and the second movable section 112*t*. The Y-axis actuator 151 is located between the second movable section 112*b* and the suspension 135 (and the suspension 137), and the Y-axis actuator 151 connects the first movable section 111 and the second movable section 112*b*.

Figure 4:
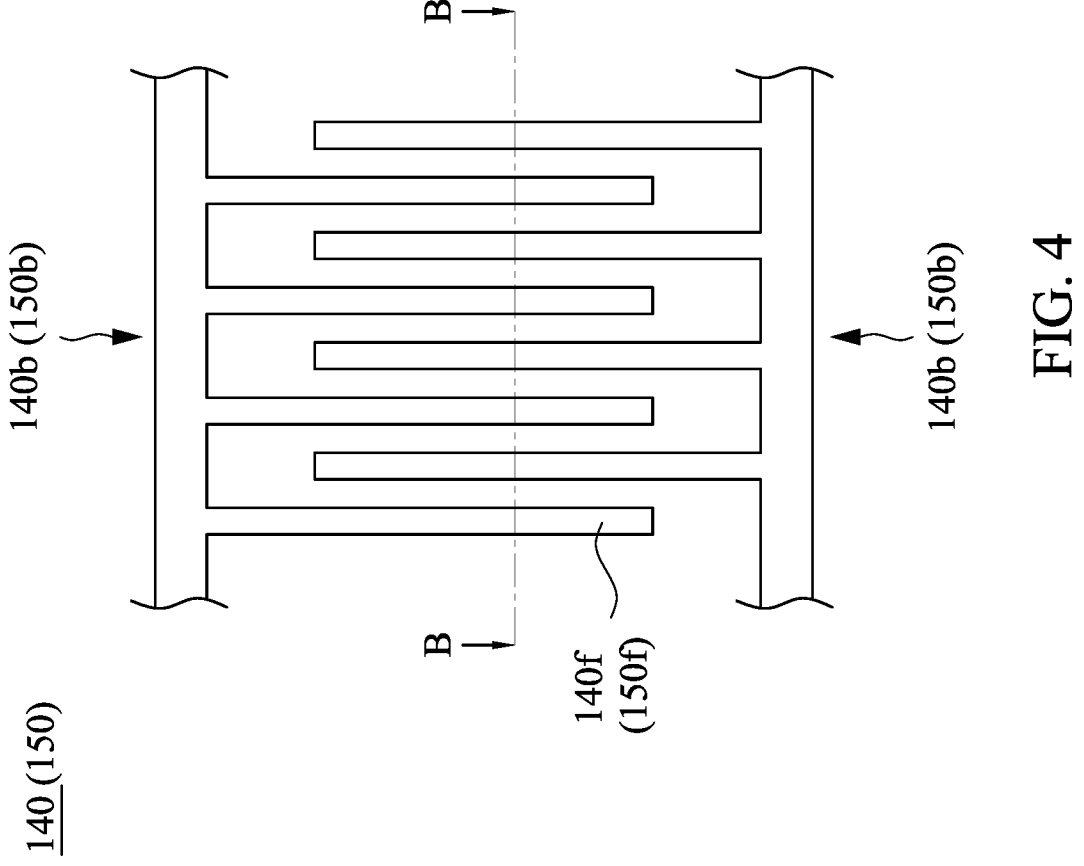
FIG. 4 depicts a schematic top view of comb electrodes.
Figure 5:
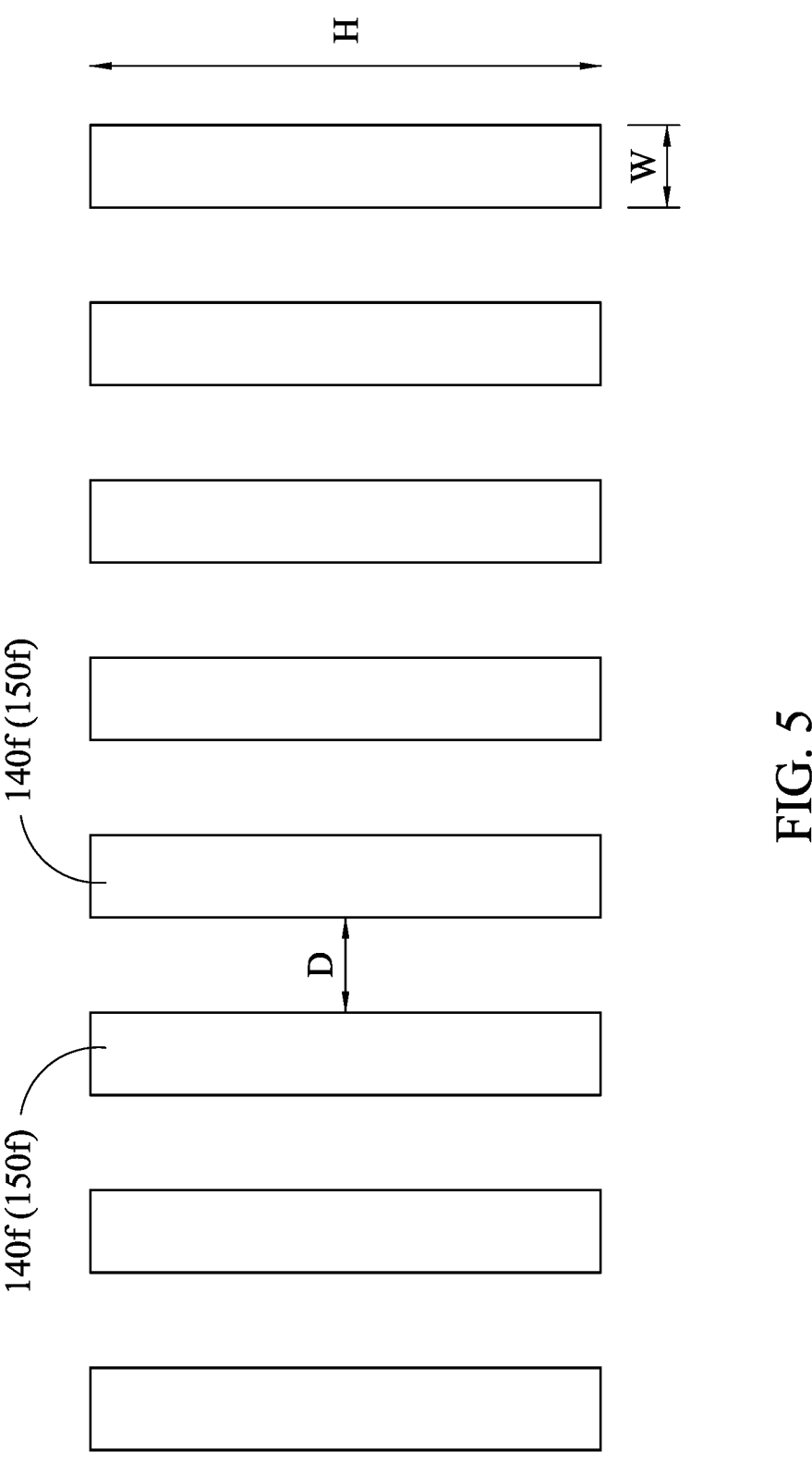
FIG. 5 depicts a schematic cross-sectional view taken along line B-B in FIG. 4.

A description is provided with reference to FIG. 1, FIG. 4, and FIG. 5. FIG. 4 depicts a schematic top view of comb electrodes. FIG. 5 depicts a schematic cross-sectional view taken along line B-B in FIG. 4. Structures of the X-axis actuators 140, 141, 142, and 143 are the same. Take the X-axis actuator 140 for example. The X-axis actuator 140 includes a pair of first comb electrodes 140*b* opposite to each other. Each of the first comb electrodes 140*b* includes a plurality of first fingers 140*f*. These first fingers 140*f* are spaced apart from and arranged in parallel with one another. A minimum distance D between the adjacent first fingers 140*f* is less than 30 microns. An aspect ratio of the first fingers 140*f* is greater than 5. In greater detail, as shown in FIG. 5, the aspect ratio is the ratio of a height H to a width W.

Structures of the Y-axis actuators 150 and 151 are approximately the same as the structures of the X-axis actuators 140, 141, 142, and 143, as shown in FIG. 4 and FIG. 5. Take the Y-axis actuator 150, FIG. 4, and FIG. 5 for example. The Y-axis actuator 150 includes a pair of second comb electrodes 150*b* opposite to each other. Each of the second comb electrodes 150*b* includes a plurality of second fingers 150*f*. These second fingers 150*f* are spaced apart from and arranged in parallel with one another. The minimum distance D between the adjacent second fingers 150*f* is less than 30 microns. An aspect ratio of the second fingers 150*f* is greater than 5. In one example, the X-axis actuators 140, 141, 142, and 143 and the Y-axis actuators 150 and 151 may be actuators driven by utilizing thermal expansion. In one example, the X-axis actuators 140, 141, 142, and 143 and the Y-axis actuators 150 and 151 may be actuators driven by utilizing piezoelectricity.

Figure 6:
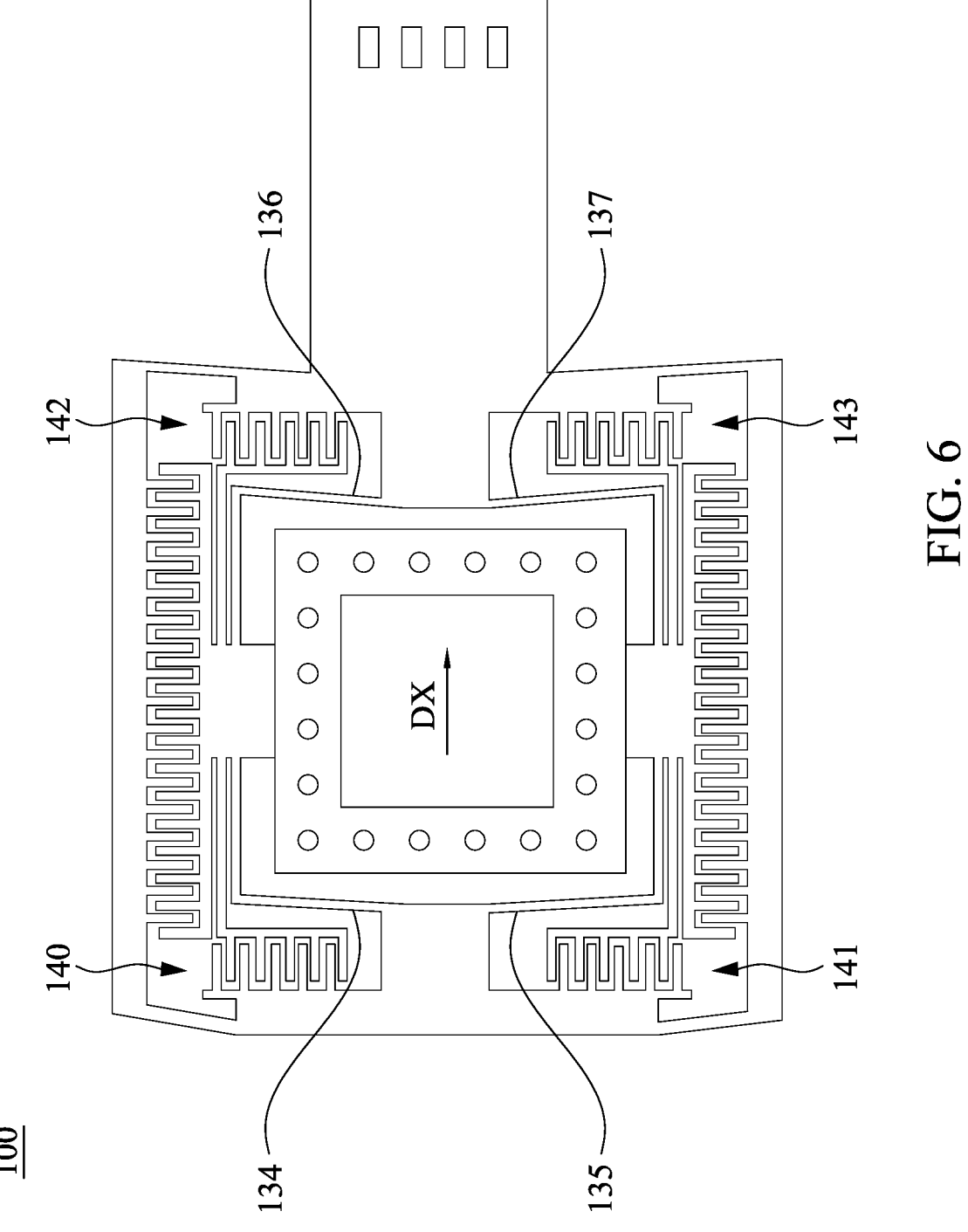
FIG. 6 depicts a schematic diagram of an X-axis displacement state of wires of the transducer wiring board in FIG. 1.

A description is provided with reference to FIG. 6. FIG. 6 depicts a schematic diagram of an X-axis displacement state of wires of the transducer wiring board 100 in FIG. 1. Through driving by the X-axis actuators 140, 141, 142, and 143, the movable unit 110 can generate a displacement parallel with the X axial direction DX. In greater detail, after a voltage is applied, the X-axis actuator 140 and the X-axis actuator 141 generate a pushing force, and the X-axis actuator 142 and the X-axis actuator 143 generate a pulling force.

Figure 7:
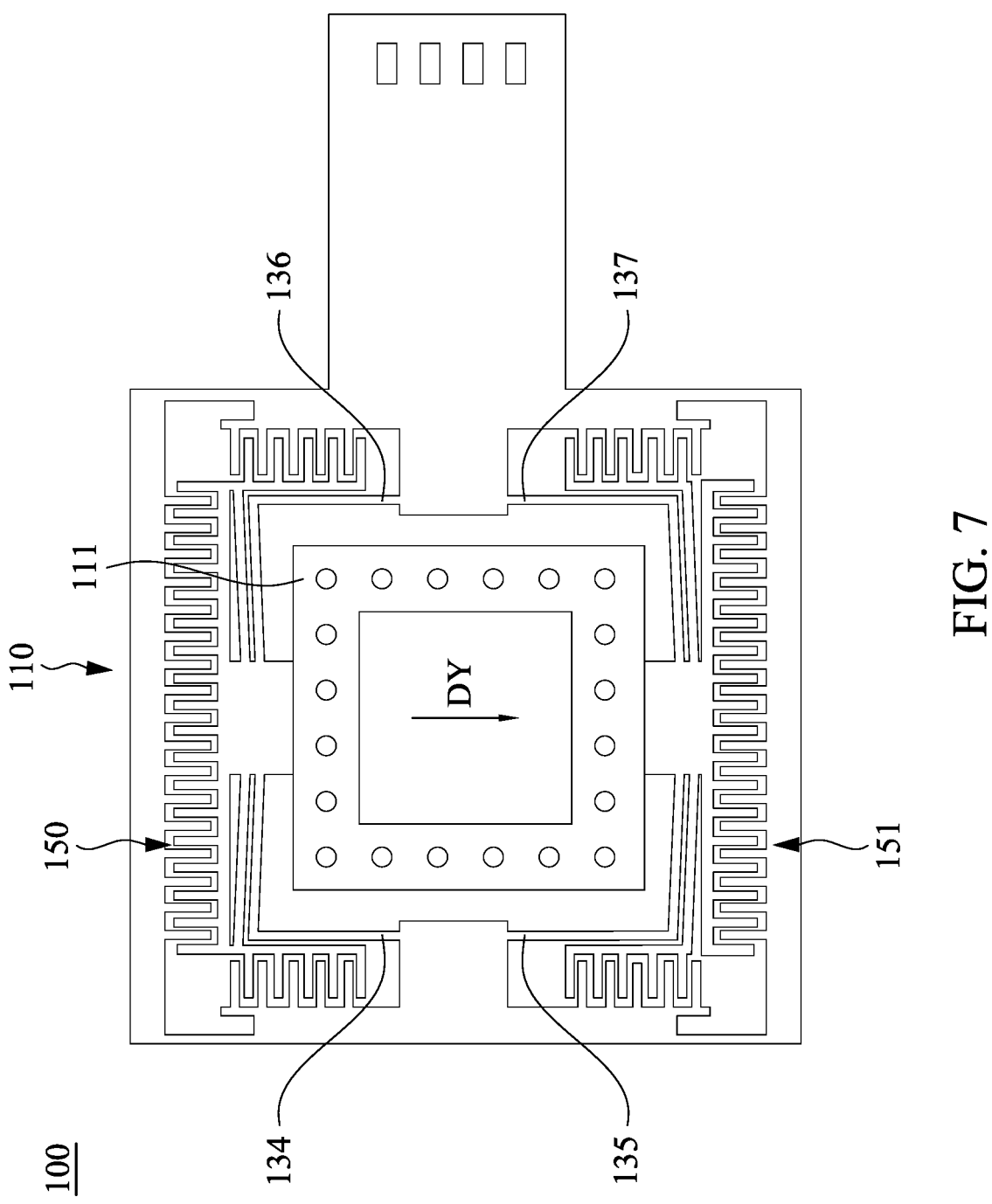
FIG. 7 depicts a schematic diagram of a Y-axis displacement state of the wires of the transducer wiring board in FIG. 1.

A description is provided with reference to FIG. 7. FIG. 7 depicts a schematic diagram of a Y-axis displacement state of the wires of the transducer wiring board 100 in FIG. 1. Through driving by the Y-axis actuators 150 and 151, the first movable section 111 in the movable unit 110 can generate a displacement parallel with the Y axial direction DY. In greater detail, after the voltage is applied, the Y-axis actuator 150 generates a pushing force, and the Y-axis actuator 151 generates a pulling force.

It is thus understood that the X-axis actuators 140, 141, 142, and 143 can drive the first movable section 111 to generate the displacement in the X axial direction DX, and the Y-axis actuators 150 and 151 can drive the first movable section 111 to generate the displacement in the Y axial direction DY. By further cooperating with the higher rigidity and resistance to bending fatigue that the suspensions 134, 135, 136, and 137 have, the movement and resilience in the plane direction and the high bending resistance in the height direction are achieved. Therefore, the transducer 300 disposed on the first movable section 111 only moves along the plane (that is, the XY plane) and its height does not change when vibrating. As a result, the image quality is not affected.

Figures 8A, 8B, 8C:
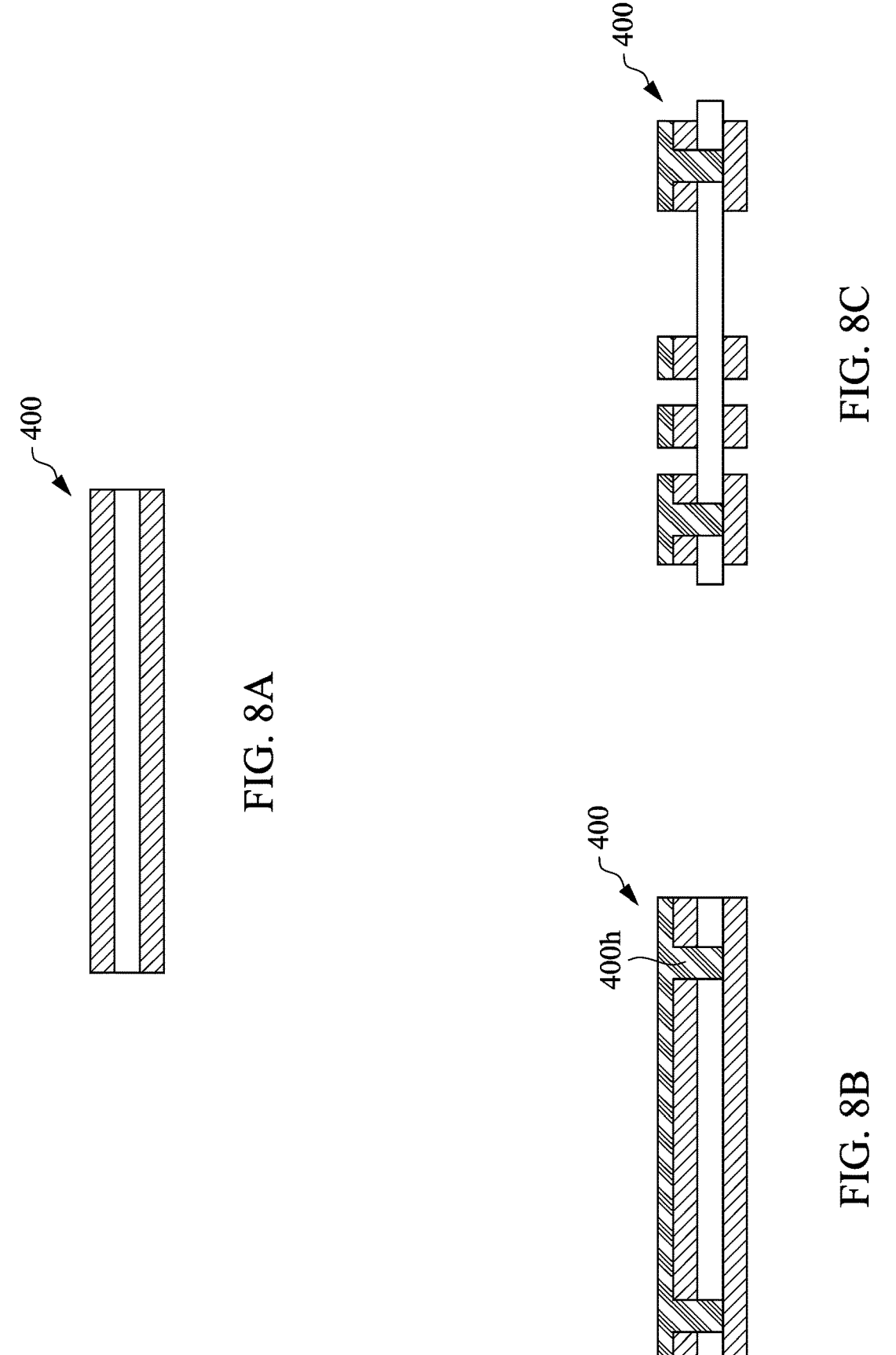
FIG. 8A to FIG. 8H depict schematic cross-sectional views of a method for manufacturing the transducer wiring board in FIG. 2.
Figure 8E:
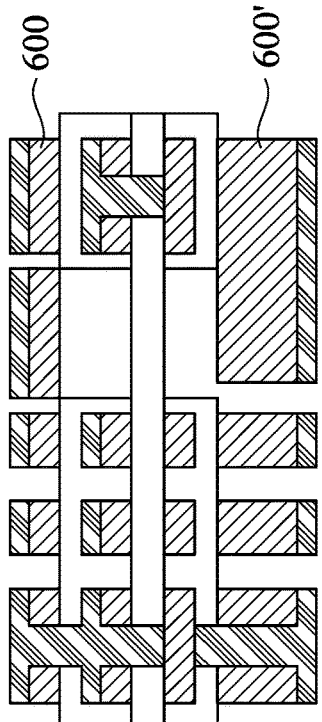
Figure 8D:
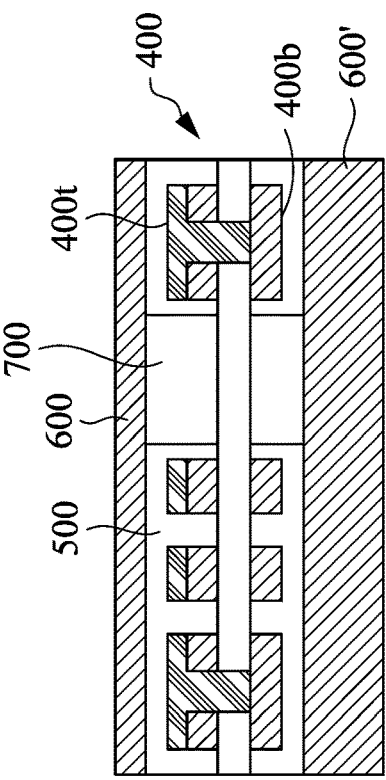
Figures 8F, 8G, 8H:
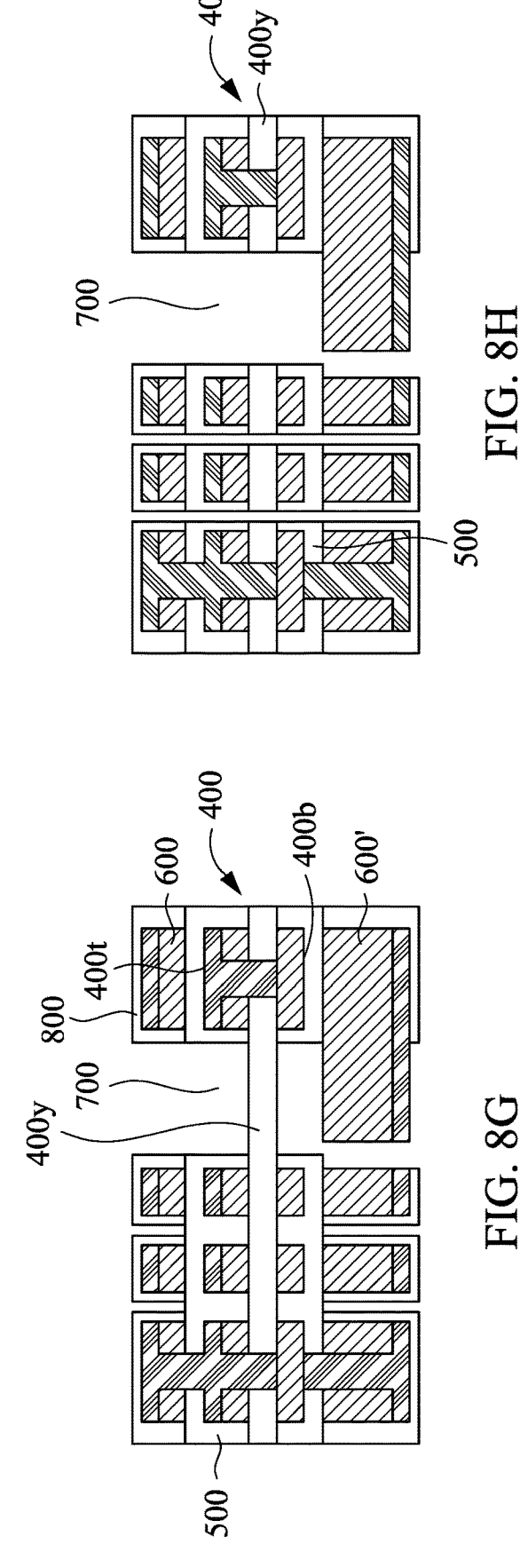

A description is provided with reference to FIG. 8A to FIG. 8H. FIG. 8A to FIG. 8H depict schematic cross-sectional views of a method for manufacturing the transducer wiring board 100 in FIG. 2. As shown in FIG. 8A, a substrate 400 is first provided. Then, as shown in FIG. 8B, a plurality of conductive vias 400*h* are formed in the substrate 400. Next, as shown in FIG. 8C, the substrate 400 is patterned. That is, a photo-etching method is used to pattern the substrate 400. After that, as shown in FIG. 8D, metal layers 600 and 600' are respectively adhered to a top surface 400*t* and a bottom surface 400*b* of the substrate 400 by using an insulating medium 500 after the substrate 400 is patterned, and a cavity portion 700 is formed between the metal layer 600 on the top surface 400*t* of the substrate 400 and the metal layer 600' on the bottom surface 400*b* of the substrate 400. Then, as shown in FIG. 8E, the metal layers 600 and 600' are patterned. Next, as shown in FIG. 8F, part of the metal layer 600 on the top surface 400*t* of the substrate 400 is removed. That is, the metal layer 600 over the cavity portion 700 is removed. After that, as shown in FIG. 8G, a protective film 800 is formed on the metal layers 600 and 600' on the top surface 400*t* and the bottom surface 400*b* of the substrate 400 after removing the part of the metal layer 600 on the top surface 400*t* of the substrate 400, in which the protective film 800 is a solder mask. As shown in FIG. 8H, the insulating medium 500 and a base layer 400*y* of the substrate 400 are thereafter cut. That is, the insulating medium 500 is cut, and the base layer 400*y* in the substrate 400 located in the cavity portion 700 is cut and removed.

As can be understood from the above embodiments, one of the advantages of the present disclosure is that the X-axis actuators and the Y-axis actuators of the transducer wiring board of the present disclosure can generate the pushing forces or pulling forces after the voltage is applied. In addition, the suspensions connect the movable unit and the fixing unit. Through the cooperation of the suspensions, the X-axis actuators, and the Y-axis actuators, the transducer can be bonded onto the movable unit stably to achieve the anti-shake effect. Therefore, the transducer can only move along the XY plane and its height does not change, so as to ensure the image quality. The suspensions can not only provide the support and resilient functions, but also provide the functions of transmitting signals and electrical energy without the current problem that the permanent magnet interferes with the signals. In addition to that, the configuration of the suspensions, the X-axis actuators, and the Y-axis actuators can solve the current problem of increased package size caused by the voice coil motor.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure covers modifications and variations of this disclosure provided they fall within the scope of the following claims and their equivalents.

What is claimed is:

1. A transducer wiring board comprising:
a movable unit comprising:
a first movable section; and
a plurality of second movable sections disposed on two sides of the first movable section along a Y axial direction;
a fixing unit disposed spaced apart from the movable unit and comprising:
a plurality of fixing sections disposed on another two sides of the first movable section along an X axial direction;
a plurality of suspensions, connecting the movable unit and the fixing unit apiece;
a plurality of X-axis actuators, located between one of the fixing sections and one of the suspensions apiece, wherein each of the X-axis actuators connects one of the fixing sections and the first movable section; and
a plurality of Y-axis actuators, located between one of the second movable sections and one of the suspensions apiece, wherein each of the Y-axis actuators connects the first movable section and the one of the second movable sections.

2. The transducer wiring board of claim 1, wherein the movable unit further comprises a plurality of transducer connection pads, and the transducer connection pads are disposed on the first movable section.

3. The transducer wiring board of claim 1, wherein the fixing unit further comprises a connecting portion, and the connecting portion is connected to one of the fixing sections.

4. The transducer wiring board of claim 1, wherein each of the suspensions is a suspension wire.

5. The transducer wiring board of claim 1, wherein each of the suspensions is an elastic sheet.

6. The transducer wiring board of claim 1, wherein each of the X-axis actuator comprises a pair of first comb electrodes opposite to each other, wherein each of the first comb electrodes comprises a plurality of first fingers, and the first fingers are spaced apart from and arranged in parallel with one another.

7. The transducer wiring board of claim 6, wherein a minimum distance between adjacent two of the first fingers is less than 30 microns while an aspect ratio of each of the first fingers is greater than 5.

8. The transducer wiring board of claim 1, wherein each of the Y-axis actuators comprises a pair of second comb electrodes opposite to each other, wherein each of the second comb electrodes comprises a plurality of second fingers, and the second fingers are spaced apart from and arranged in parallel with one another.

9. The transducer wiring board of claim 8, wherein a minimum distance between adjacent two of the second fingers is less than 30 microns while an aspect ratio of each of the second fingers is greater than 5.

10. The transducer wiring board of claim 1, wherein the movable unit further comprises a plurality of transducer connection pads, and the transducer connection pads are disposed on the first movable section,
wherein the fixing unit further comprises a connecting portion, and the connecting portion is connected to one of the fixing sections.

11. The transducer wiring board of claim 1, wherein each of the X-axis actuator comprises a pair of first comb electrodes opposite to each other, wherein each of the first comb electrodes comprises a plurality of first fingers, and the first fingers are spaced apart from and arranged in parallel with one another,
wherein each of the Y-axis actuators comprises a pair of second comb electrodes opposite to each other, wherein each of the second comb electrodes comprises a plurality of second fingers, and the second fingers are spaced apart from and arranged in parallel with one another.

12. The transducer wiring board of claim 11, wherein a minimum distance between adjacent two of the first fingers is less than 30 microns while an aspect ratio of each of the first fingers is greater than 5,
wherein a minimum distance between adjacent two of the second fingers is less than 30 microns while an aspect ratio of each of the second fingers is greater than 5.

13. The transducer wiring board of claim 12, wherein each of the suspensions is a suspension wire.

14. The transducer wiring board of claim 12, wherein each of the suspensions is an elastic sheet.

* * * * *